United States Patent
Koshti et al.

(10) Patent No.: US 12,406,079 B2
(45) Date of Patent: Sep. 2, 2025

(54) SYSTEM AND METHOD FOR DETECTING INTERNAL DATA BREACH WITH INTELLIGENT DATA INFORMATION SECURITY ENGINE

(71) Applicant: Bank of America Corporation, Charlotte, NC (US)

(72) Inventors: Prakash Koshti, Hyderabad (IN); Sarika Agarwal, Gurugram (IN)

(73) Assignee: Bank of America Corporation, Charlotte, NC (US)

( * ) Notice: Subject to any disclaimer, the term of this patent is extended or adjusted under 35 U.S.C. 154(b) by 223 days.

(21) Appl. No.: 18/364,936

(22) Filed: Aug. 3, 2023

(65) Prior Publication Data

US 2025/0045437 A1 Feb. 6, 2025

(51) Int. Cl.
*G06F 21/62* (2013.01)
*G06F 16/242* (2019.01)
*G06F 16/2452* (2019.01)
*G06F 16/2457* (2019.01)

(52) U.S. Cl.
CPC ...... *G06F 21/6218* (2013.01); *G06F 16/2433* (2019.01); *G06F 16/24522* (2019.01); *G06F 16/24578* (2019.01)

(58) Field of Classification Search
CPC .... G06F 21/62; G06F 21/6218; G06F 16/242; G06F 16/2433; G06F 16/24522; G06F 16/2452; G06F 16/2457; G06F 16/24578
See application file for complete search history.

(56) References Cited

U.S. PATENT DOCUMENTS

| | | |
|---|---|---|
| 8,875,247 B2 | 10/2014 | Bao et al. |
| 9,235,617 B1 | 1/2016 | Blackwell, Jr. et al. |
| 9,244,627 B2 | 1/2016 | Helmer |
| 9,323,764 B2 | 4/2016 | Goodman et al. |
| 9,412,412 B2 | 8/2016 | Rehm et al. |
| 9,483,659 B2 | 11/2016 | Bao et al. |
| 10,204,177 B2 | 2/2019 | Ballentine et al. |
| 10,223,541 B2 | 3/2019 | Balijepalli et al. |
| 10,311,234 B2 | 6/2019 | Bhashkar et al. |
| 10,979,458 B2 | 4/2021 | Narayanaswamy et al. |
| 10,997,599 B2 | 5/2021 | Adjaoute |
| 11,062,317 B2 | 7/2021 | Adjaoute |
| 11,087,225 B2 | 8/2021 | Nickl et al. |
| 11,238,390 B2 | 2/2022 | Brannon et al. |
| 11,244,045 B2 | 2/2022 | Lunsford et al. |

(Continued)

*Primary Examiner* — Sargon N Nano

(57) ABSTRACT

A system for receiving, from a plurality of systems, data breach criteria and user activity data associated with a user. The system uses a first machine learning model, the data breach criteria, and the user activity data to determine a plurality of data breach fields and information values for the plurality of data breach fields. The system receives a query from the user to request access to a dataset associated with the plurality of systems. The system uses a second machine learning model to determine data sensitive fields in the query. The system uses a third machine learning model to determine ranking values for the data sensitive fields and a data information loss value. In response to determining the data information loss value is smaller than a predetermined threshold, the system validates the query from the user to allow the user to access the dataset.

18 Claims, 4 Drawing Sheets

(56) References Cited

U.S. PATENT DOCUMENTS

| | | | |
|---|---|---|---|
| 11,308,205 B2 | 4/2022 | Koshti et al. | |
| 11,544,409 B2 | 1/2023 | Brannon et al. | |
| 11,586,700 B2 | 2/2023 | Whitney et al. | |
| 11,593,476 B2 | 2/2023 | Van Dyke | |
| 2017/0118236 A1* | 4/2017 | Devi Reddy | H04L 63/1425 |
| 2019/0243969 A1* | 8/2019 | Birur | G06F 21/552 |
| 2021/0149993 A1* | 5/2021 | Torres | G06N 3/045 |
| 2021/0165901 A1* | 6/2021 | Chandrashekhar | G06F 21/6218 |
| 2022/0337608 A1* | 10/2022 | Serna | H04L 63/1425 |
| 2022/0353276 A1* | 11/2022 | Hegrat | G06N 20/00 |
| 2023/0325292 A1* | 10/2023 | Ardel | G06N 3/0455 |

* cited by examiner

SYSTEM AND METHOD FOR DETECTING INTERNAL DATA BREACH WITH INTELLIGENT DATA INFORMATION SECURITY ENGINE

TECHNICAL FIELD

The present disclosure relates generally to processing architectures, and more specifically to a system and method for detecting internal data breach with intelligent data information security engine.

BACKGROUND

Large organizations implement complicated computer infrastructures that involve many systems that generate a large volume of both structured and unstructured sensitive data used for software applications. The sensitive data may be associated with different user activities for users of the large organization in daily or periodic work. In particular, the sensitive data may be stored at any location within the plurality of systems, such as applications, data storages, code repositories, relational databases, file systems, tables, text, documents, external files, structured data sources, unstructured data sources, cloud data sources, big data sources, and the like. However, users with access to multiple systems and a wide scope of data may pose a threat in the form of internal data breaches. This means that existing computer systems are limited in their ability to control what can be accessed by particular groups of users.

SUMMARY

The system disclosed in the present application provides a technical solution to the technical problems discussed above by providing the capability to identify if a user requests to access the sensitive data which is not intended to be accessible for that user. The disclosed system provides several practical applications and technical advantages which include a process for determining a data information loss value associated with the user when the user requests to access information in a specific area which includes sensitive data that is not required or appropriate for the user's work. The disclosed system provides an intelligent data information security engine to implement one or more machine learning models to reduce the likelihood of data breach events. This approach may be implemented with quantum computing resources to perform at a high speed to flag a possible data breach event for real-time query execution. In addition, the disclosed system provides a process for recognizing user roles and access privileges and automatically determining associated suggestions between various data sources. For example, the process may determine clusters, correlations, and forecasting based on the user roles and access privileges. As another example, the process may display a plurality of analytic results on a display for visual analytics and comprehension analytics.

In one embodiment, the disclosed system includes a device that is configured to receive, from a plurality of systems, data breach criteria and user activity data associated with a user. In particular, the user accesses the user activity data in periodic operational work in conjunction with the plurality of systems. For example, the user activity data may be generated directly or indirectly in day-to-day operational work. The system is configured to use a first machine learning model, the data breach criteria, and the user activity data associated with the user to determine a plurality of data breach fields which are not intended to be accessible to the user. The first machine learning model is generated using a self-organizing map (SOM) algorithm to apply augmented analysis on the user activity data associated with the user. The system is configured to apply the first machine learning model to a plurality of information values associated with the user for the plurality of data breach fields. For example, a respective information value associated with the user for each of the plurality of data breach fields is determined using valid patterns and invalid patterns of the data breach criteria.

The system is further configured to receive a query from the user to request access to a dataset associated with the plurality of systems. Upon receiving the query from the user, the system is configured to use a second machine learning model to determine a structured intermediate representation of the query. In particular, the structured intermediate representation of the query includes one or more data sensitive fields which are extracted using semantic parsing. The second machine learning model includes an encoder-decoder infrastructure using one or more Long Short-Term Memory (LSTM) models to covert the query to logical form. The system is configured to use a third machine learning model, such as a random forest model, and the plurality of information values to determine a plurality of ranking values for the one or more data sensitive fields. Based on the plurality of ranking values for the one or more data sensitive fields and a predetermined threshold, the system is configured to determine a data information loss value to validate the query from the user to allow the user to access the dataset associated with the plurality of systems. For example, when the data information loss value is above the predetermined threshold, the system may flag the query of the user as a data breach event and rejects the query from the user. Furthermore, the query of the user would be used to update the invalid patterns of the data breach criteria. As another example, when the data information loss value is below the predetermined threshold, the system validates the query from the user. Furthermore, the query of the user would be used to update the user activity data associated with the user. Through this process, the system is able to improve the operation of an underlying computer system by providing better data breach prevention for operation support.

Certain embodiments of the present disclosure may include some, all, or none of these advantages. These advantages and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

Figure 1:
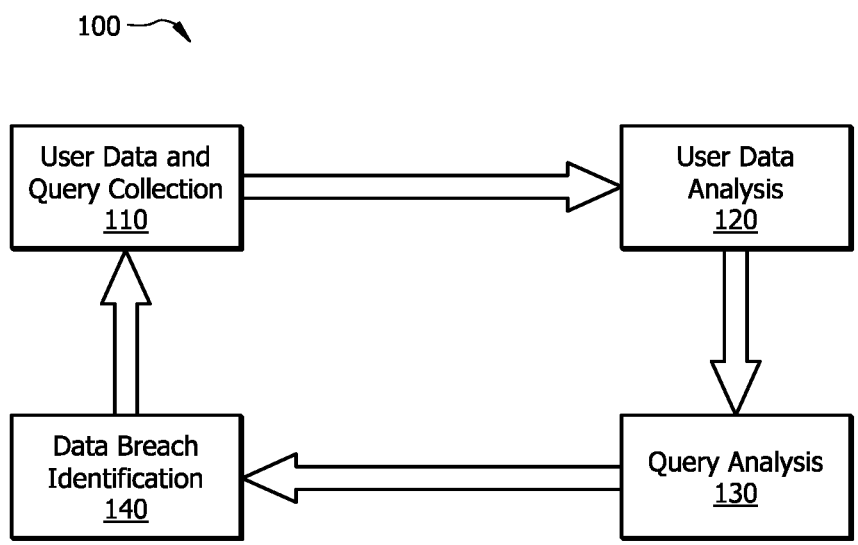
FIG. 1 illustrates one embodiment of a system configured to manage data breach events.
Figure 2:
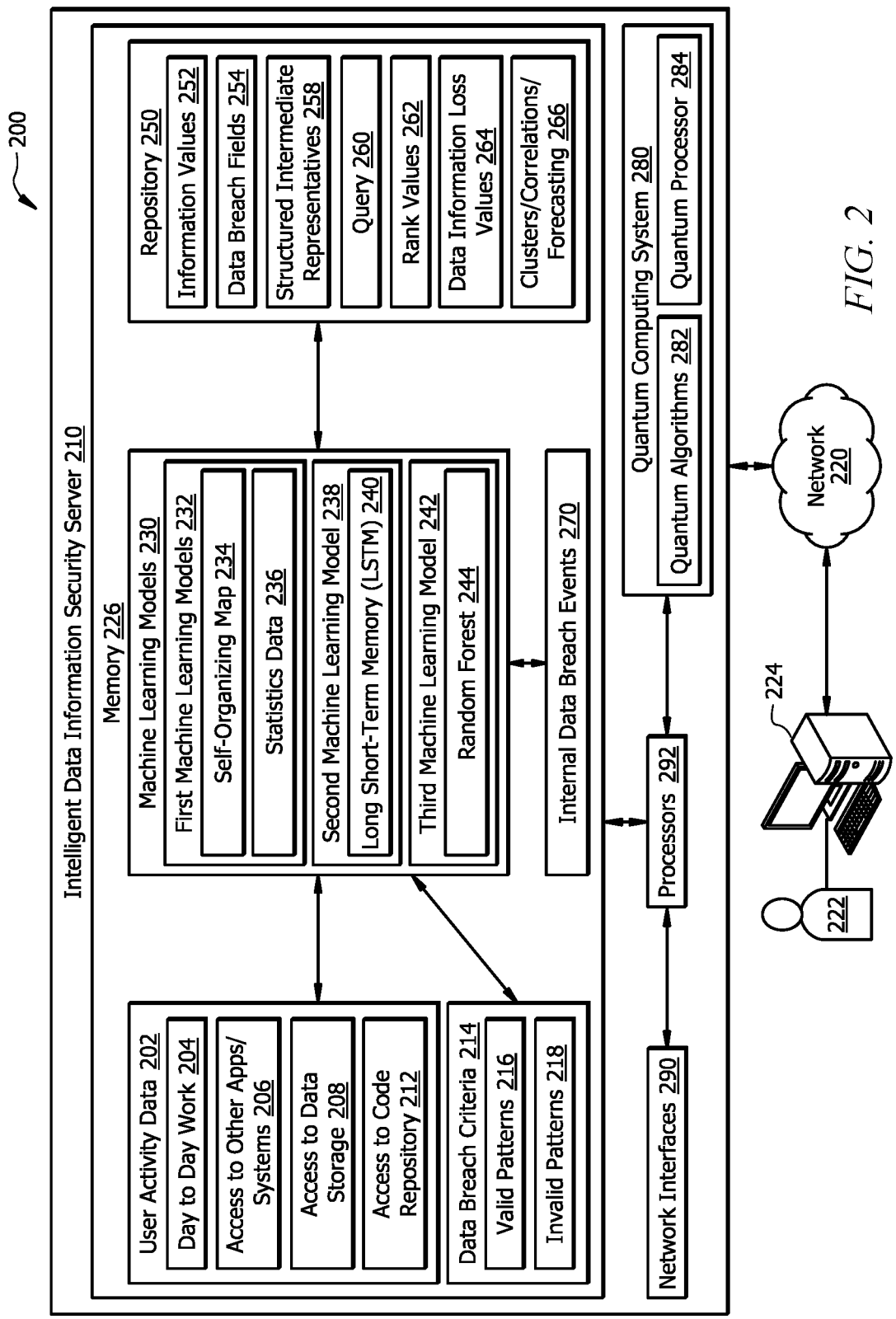
FIG. 2 is one embodiment of an intelligent data information security system.
Figure 3:
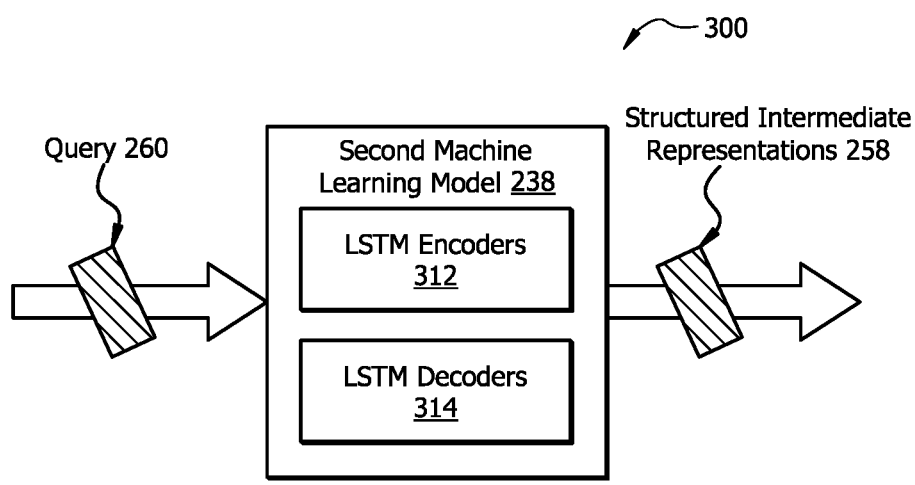
FIG. 3 is one embodiment of a machine learning model configured to determine a structured intermediate representation for a query.
Figure 4:
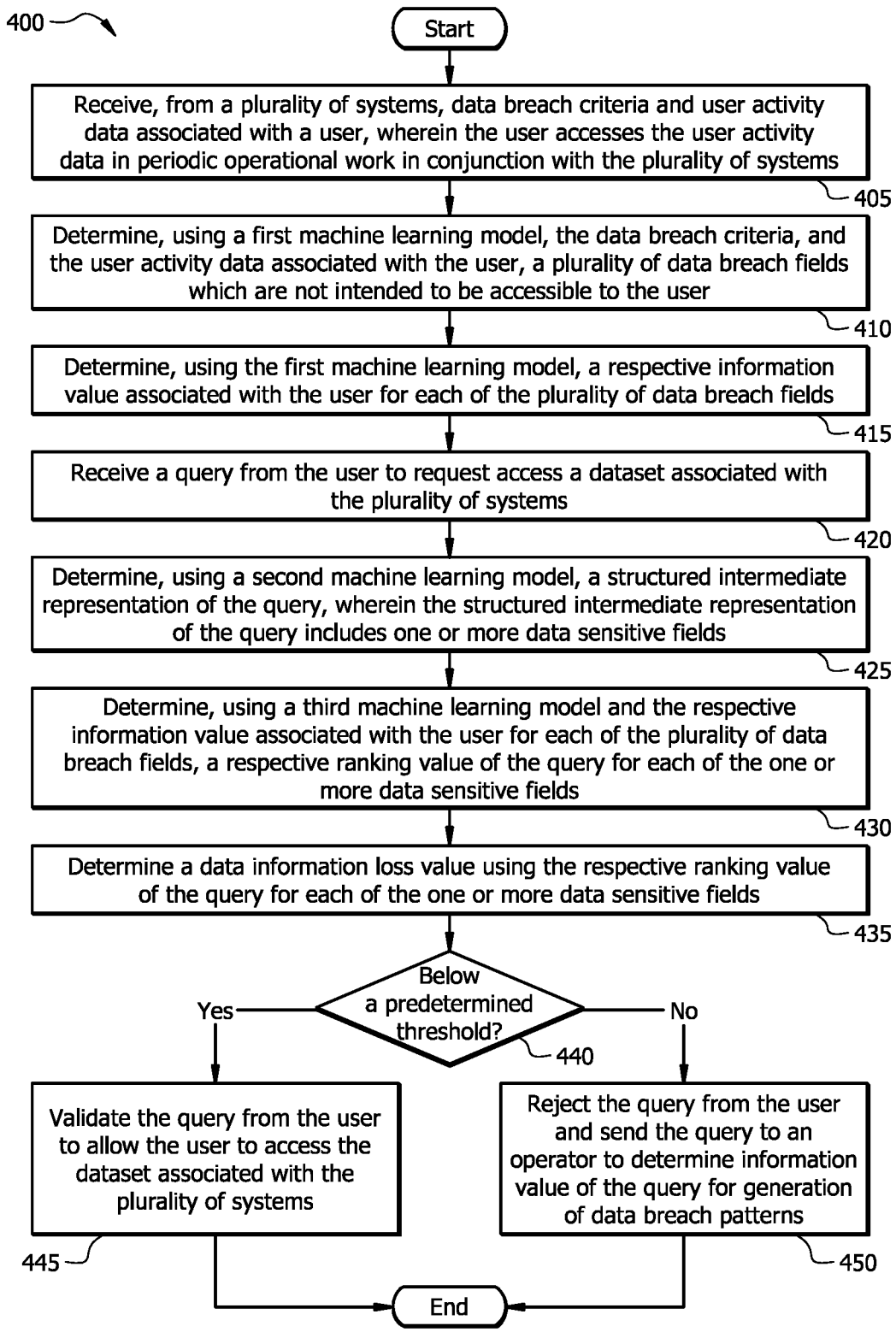
FIG. 4 illustrates one embodiment of a method for managing data breach events.

As described above, previous technologies are limited in their ability to control what can be accessed by particular groups of users in order to detect internal data breach events. This disclosure provides various systems and methods to manage internal data breach events using an intelligent data information security server based on one or more machine learning models. FIG. 1 illustrates a system 100 configured to manage data breach events. FIG. 2 illustrates an intelligent data information security system 200 of the system 100 of FIG. 1. FIG. 3 illustrates machine learning model 300 configured to determine a structured intermediate representation for a query. FIG. 4 illustrates an operational flow of a method 400 for managing data breach events.

Example System for Managing Internal Data Breach Events

FIG. 1 illustrates one embodiment of a system 100 that is configured to manage data breach events. System 100 provides an optimized security model which includes one or more machine learning models 230 to detect a plurality of internal data breach events 270 using user activity data 202 associated with a plurality of systems of an organization. For example, the organization may be any suitable organization that maintains sensitive information. In a particular embodiment, the organization may be a banking organization that maintains sensitive information associated with multiple assets from a plurality of business units, such as finance, organization, planning, production, sales, buying, research, product development, quality assurance, safety, and environment (HSE), etc. Internal data breach events 270 may occur when a user 222 accidentally or intentionally accesses the sensitive information without permission or a security check. The internal data breach events 270 usually lead to accidental or unlawful destruction, loss, alteration, or unauthorized disclosure of the sensitive information. As a result, the internal data breach events 270 may deteriorate the integrity of the organization by causing a negative impact for business and reputation of the organization. The organization may implement a traditional security model to perform post-mortem approach to manage the internal data breach events 270 using various actions associated with a plurality of security levels for the plurality of systems. For example, the traditional security model may use various security levels based on a plurality of rules to manage data breaches after they already happen more than once. As another example, the various actions comprise changing passwords, sending a security alert to an operator, freezing user accounts, etc. However, it is difficult to prevent an internal data breach event 270 associated with a user 222 who is at an upper level of the organization and has access to the plurality of systems. It is desired to develop an improved security model optimized to automatically identify internal data breach events 270 using a plurality of user-specific underlying patterns of internal data breach events 270 associated with a user 222. As a result, system 100 is configured to apply the optimized security model to efficiently detect the internal data breach events 270 associated with the user 222 before the data breach events occur or cause information loss to the organization. The optimized security model is applied to analyze behaviors of the user 222 to determine whether the behaviors deviate from expected access patterns for the user 222.

In some embodiments, system 100 may be configured to manage the internal data breach events 270 associated with a user 222 in four primary operations: 1) user data and query collection 110, 2) user data analysis 120, 3) query analysis 130, and 4) data breach identification 140. In the operation of user data and query collection 110, user data comprises user activity data 202 and data breach criteria 214 associated with the user 222. These primary operations are described herein with reference to FIG. 1 as well as to various elements from FIG. 2. For example, system 100 is configured to access a large amount of user activity data 202 associated with the user 222. The user activity data 202 associated with the user 222 may be generated directly or indirectly in day-to-day operational work for the user 222 to access to applications, systems, data storages, code repositories, relational databases, file systems, tables, text, documents, external files, structured data sources, unstructured data sources, cloud data sources, big data sources, etc. Likewise, the user 222 may access the user activity data 202 stored in a database in periodic operational work in conjunction with the plurality of systems. As another example, system 100 is configured to receive data breach criteria 214 associated with the user 222. The data breach criteria 214 includes one or more rules to describe the internal data breach events 270 associated with loss of control and/or system security information, such as usernames, passwords, security question responses, etc. As another example, system 100 is configured to receive a query 260 from the user 222 to request access to a dataset associated with the plurality of systems. In particular, the query 260 from the user 222 includes a text input based on a plurality of structured query language (SQL) fields. The plurality of SQL fields include sequence order, alias names, and query injection. The user data associated with the user 222 may be stored in a database and continuously updated with new user data. Likewise, the user data associated with the user may include normal data events with valid patterns 216 and internal data breach events 270 with invalid patterns 218 for the user 222.

In some embodiments, system 100 is configured to analyze the user data in the operation of user data analysis 120. In particular, system 100 may analyze the user data associated with the user 222 to understand different patterns associated with the user's work. For example, system 100 is configured to generate a first machine learning model 232 (illustrated in FIG. 1) to apply augmented analysis on the user data associated with the user 222. For example, the first machine learning model 232 may be generated using a self-organizing map (SOM) 234 algorithm. As another example, the first machine learning model 232 may be generated based on an augmented analysis of statistics data 236 derived from the user data associated with the user 222. As a result, system 100 may apply the first machine learning model 232, the data breach criteria 214, and the user activity data 202 associated with the user 222 to determine a plurality of data breach fields 254 which are not intended to be accessible to the user 222. For each of the plurality of data breach fields 254, system 100 may use the first machine learning model 232 to determine a respective information value associated with the user 222. In particular, system 100 may use the first machine learning model 232 to determine a plurality of natural clusters, correlations, and forecasting 266 associated with the user to represent different patterns of the user's operational work. For example, upon receiving a query of "request to access salary data for business staff" from a user 222 at a level of research advisor, system 100 may apply the first machine learning model 232 to identify the salary data is labeled sensitive information to the user 222, which may cause a threat of data breach to the organization. System 100 may train the first machine learning model 232 to update the plurality of natural clusters, correlations, and forecasting 266 to include additional user activity data to make suggestions to help the user 222 to complete a task in an automated approach with increased accuracy, speed, and scalability.

In some embodiments, system 100 may be configured to analyze the user data in the operation of query analysis 130.

In particular, system 100 is configured to parse the query 260 from the user 222 using semantic parsing to determine various characteristics of the query 260 from the user 222. For example, system 100 may determine a machine understandable form of the query 260 by converting a plurality of natural language words of the input text associated with the query 260 to a structured intermediate representation in logical form. The structured intermediate representation of the query 260 includes one or more data sensitive fields to capture the user's intent associated with query 260 from the user 222. For example, the second machine learning model 238 may be generated using one or more Long Short-Term Memory (LSTM) networks 240. Using various semantic descriptions of the structured intermediate representation of the query 260 form the user 222, system 100 is configured to determine various characteristics of the user activity data 202 that is relevant to the query 260 from the user 222.

In some embodiments, system 100 may be configured to detect internal data breach events 270 in the operation of data breach identification 140. System 100 is configured to apply a third machine learning model 242 and the respective information value associated with the user 222 for each of the plurality of data breach fields 254 to determine a respective ranking value 262 of the query 260 for each of the one or more data sensitive fields. System 100 may determine a data information loss value 264 using the respective ranking value 262 of the query 260 for each of the one or more data sensitive fields. System 100 may compare the data information loss value 264 associated with the query 260 from the user 222 to a predetermined threshold which is determined based prior experience or by the user 222. In response to determining the data information loss value 264 is smaller than the predetermined threshold, system 100 is configured to validate the query 260 from the user 222 to allow the user 222 to access the dataset associated with the plurality of systems. In response to determining the data information loss value 264 is greater than the predetermined threshold, system 100 is configured to reject the query 260 from the user 222 and send the query 260 to an operator for generation of data breach patterns.

Example of an Intelligent Data Information Security System

FIG. 2 illustrates one embodiment of an example of an intelligent data information security system 200 that is configured to generate one or more machine learning models 230 to detect internal data breach events 270 using user activity data 202 and data breach criteria 214 for a plurality of systems of an organization. In one embodiment, the intelligent data information security system 200 comprises an intelligent data information security server 210. In some embodiments, the intelligent data information security system 200 further comprises a network 220 and an electronic device 224, such as a mobile phone electronic device, a tablet computer electronic device, a laptop computer electronic device, and so forth. For example, a user 222, such as an employee of the organization, may use the electronic device 224 to perform periodic operational work in conjunction with a plurality of systems of the organization. The intelligent data information security system 200 is configured to use the intelligent data information security server 210 coupled to the electronic device 224 via network 220. Network 220 enables communications among components of the intelligent data information security system 200. In other embodiments, the intelligent data information security system 200 may not have all of the components listed and/or may have other elements instead of, or in addition to, those listed above. In particular embodiments, as further depicted by FIG. 2, the intelligent data information security server 210 may include, among other things, one or more processor(s) 292, memory 226, quantum computing system 280, a display, input structures, and network interfaces 290. In particular embodiments, the one or more processor(s) 292 may be operably coupled with the memory 226 and the quantum computing system 280 to perform various algorithms, processes, or functions. The quantum computing system 280 may comprise a quantum processor 284 in signal communication with the memory 226 and network interfaces 290. It should be noted that FIG. 2 is merely one example of a particular implementation and is intended to illustrate the types of components that may be included as part of the intelligent data information security system 200.

System Components

Network

Network 220 may be any suitable type of wireless and/or wired network. The network 220 may or may not be connected to the Internet or public network. The network 220 may include all or a portion of an Intranet, a peer-to-peer network, a switched telephone network, a local area network (LAN), a wide area network (WAN), a metropolitan area network (MAN), a personal area network (PAN), a wireless PAN (WPAN), an overlay network, a software-defined network (SDN), a virtual private network (VPN), a mobile telephone network (e.g., cellular networks, such as 4G or 5G), a plain old telephone (POT) network, a wireless data network (e.g., WiFi, WiGig, WiMax, etc.), a long-term evolution (LTE) network, a universal mobile telecommunications system (UMTS) network, a peer-to-peer (P2P) network, a Bluetooth network, a near field communication (NFC) network, and/or any other suitable network. The network 220 may be configured to support any suitable type of communication protocol as would be appreciated by one of ordinary skill in the art.

Intelligent Data Information Security Server

Intelligent data information security server 210 is generally any device that is configured to process data and communicate with other components of the intelligent data information security system 200 via the network 220. Intelligent data information security server 210 comprises a processor 292 in signal communication with a memory 226, a quantum computing system 280, and network interfaces 290.

Processor 292 comprises one or more processors operably coupled to the memory 226. The processor 292 is any electronic circuitry, including, but not limited to, state machines, one or more central processing unit (CPU) chips, logic units, cores (e.g., a multi-core processor), field-programmable gate array (FPGAs), application-specific integrated circuits (ASICs), or digital signal processors (DSPs). The processor 292 may be a programmable logic device, a microcontroller, a microprocessor, or any suitable combination of the preceding. The one or more processors are configured to process data and may be implemented in hardware or software. For example, the processor 292 may be 8-bit, 16-bit, 32-bit, 64-bit, or of any other suitable architecture. The one or more processors are configured to implement various software instructions to perform the operations described herein. For example, the one or more processors are configured to execute software instructions to perform one or more functions of the intelligent data information security server 210 described herein. The processor 292 may be also referred to as a classical processor.

Network interface 290 is configured to enable wired and/or wireless communications (e.g., via network 220). The network interface 290 is configured to communicate data between the intelligent data information security server 210 and other components of the intelligent data information security system 200. For example, the network interface 290 may comprise a WIFI interface, a local area network (LAN) interface, a wide area network (WAN) interface, a modem, a switch, or a router. The processor 292 is configured to send and receive data using the network interface 290. The network interface 290 may be configured to use any suitable type of communication protocol as would be appreciated by one of ordinary skill in the art.

Memory 226 may be volatile or non-volatile and may comprise a read-only memory (ROM), random-access memory (RAM), ternary content-addressable memory (TCAM), dynamic random-access memory (DRAM), and static random-access memory (SRAM). Memory 226 may be implemented using one or more disks, tape drives, solid-state drives, and/or the like. The memory 226 is operable to store software instructions, and/or any other data and instructions. The software instructions may comprise any suitable set of software instructions, logic, rules, or code operable to be executed by the processor 292 to perform one or more functions of the intelligent data information security server 210 described herein.

In certain embodiments, the memory 226 is further operable to store large amounts of user data, such as, for example, user activity data 202 and data breach criteria 214, associated with the user 222. The user activity data 202 may comprise a plurality of datasets associated with day-to-day work 204, access to other applications/systems 206, access to data storage 208, access to code repository 212, etc. The user activity data 202 associated with the user 222 may be generated directly or indirectly in day-to-day operational work for the user 222 when accessing applications, systems, data storages, code repositories, relational databases, file systems, tables, text, documents, external files, structured data sources, unstructured data sources, cloud data sources, big data sources, etc. The user 222 may access the user activity data 202 in periodic operational work in conjunction with the plurality of systems. The data breach criteria 214 may comprise valid patterns 216 to determine normal data fields which are accessible the user 222. Likewise, the data breach criteria 214 may comprise invalid patterns 218 to determine a plurality of data breach fields which are not intended to be accessible to the user 222. For example, the data breach criteria 214 include one or more rules to describe internal data breach events 270 associated with loss of control and/or system security information, such as username, passwords, security question responses, etc.

In certain embodiments, the intelligent data information security server 210 may be configured to use a first machine learning model 232 to analyze the user activity data 202 associated with the user 222. In particular, the intelligent data information security server 210 may be configured to use the first machine learning model 232, the data breach criteria 214, and the user activity data 202 associated with the user 222 to determine a plurality of data breach fields 254 which are not intended to be accessible to the user 222. For example, when the user 222 is a technical staff of the organization, the intelligent data information security server 210 may use the user activity data 202 in periodic operational work in conjunction with the plurality of systems of the organization, such as finance, organization, planning, production, sales, buying, research, product development, quality assurance, safety, and environment (HSE), etc. The user activity data 202 may comprise various databases that the user 222 either directly or indirectly chooses in day to day operation support to perform duties of the user 222. As a result, the intelligent data information security server 210 may determine the plurality of data breach fields 254 associated with the user that may comprise finance, organization, planning, sales, buying, etc. The plurality of data breach fields 254 may be stored in a repository 250.

In certain embodiments, the intelligent data information security server 210 may be configured to use the first machine learning model 232 to determine a plurality of information values 252 associated with the user 222 for the plurality of data breach fields 254. For each of the plurality of data breach fields 254, the intelligent data information security server 210 may apply the first machine learning model 232 determine an information value 252 that is a likelihood value associated with the user 222 based on the data breach criteria 214. For example, the intelligent data information security server 210 may determine a plurality of information values for the plurality of data breach fields, such as an information value of 0.95 for a data breach field of "finance," an information value of 0.65 for a data breach field of "organization," an information value of 0.75 for a data breach field of "planning," an information value of 0.85 for a data breach field of "sales," and an information value of 0.87 for a data breach field of "buying."

In certain embodiments, the intelligent data information security server 210 may be configured to perform an unsupervised machine learning algorithm, such as a self-organizing map 234, to train the first machine learning model 232 based on the user activity data 202 and the data breach criteria 214 associated with the user 222. In particular, unsupervised learning requires only unlabeled data, such as the user activity data 202, to build a compact internal representation to formulate a pattern learning task for the data inputs. The intelligent data information security server 210 may determine a plurality of attributes associated with the user activity data 202 using statistics data 236. The first machine learning model 232 includes an objective function which is optimized by training the first machine learning model 232 to learn a compact internal representation (e.g., natural clusters) of data inputs, such as the user activity data 202, based on the plurality of attributes to solve the task of interest, such as performing a workload for the user 222. For example, the intelligent data information security server 210 may use a principal component analysis algorithm to determine the plurality of attributes using the user activity data 202 associated with the user 222. As another example, the intelligent data information security server 210 may apply the first machine learning model 232, such as the self-organizing map 234, to determine a plurality of natural clusters with various data information values associated with a threat in the form of internal data breaches. In particular, the intelligent data information security server 210 may compare the plurality of natural clusters to determine a plurality of data breach fields 254 based on valid patterns 216 and invalid patterns 218 of the data breach criteria 214. For example, a natural cluster "1" is given a label of "internal data breach" when the natural cluster has a high data information loss value based on the invalid patterns 218 of the data breach criteria 214 and a low data information loss value based on the valid patterns 216 of the data breach criteria 214. As another example, a natural cluster "2" is given a label of "normal data" when the natural cluster has a low data information loss value based on the invalid patterns 218 of the data breach criteria 214 and a high data information loss value based on the valid patterns 216 of the data breach criteria 214. As another example, a natural cluster "3" is given a label of "possible internal data breach" when the natural cluster has similar data information loss values based on the invalid patterns 218 and the valid patterns 216 of the data breach criteria 214. Thus, the intelligent data information security server 210 may determine the plurality of data breach fields 254 by choosing one or more natural clusters with the label of "internal data breach" and/or "possible internal data breach" based on the data breach criteria 214.

In certain embodiments, the intelligent data information security server 210 may be configured to receive a query 260 from the user 222 to request access to a dataset associated with the plurality of systems. The query 260 may be received from various intake channels, such as email, phone, world wide web, mobile devices, call centers, and/or the like. The query 260 may comprise various unstructured data, such as word documents, pdf documents, excel documents, verbal recordings, SQL queries, image/screenshot files, and/or the like. In particular, the query 260 may comprise a text input based on a plurality of SQL fields, such as sequence order, alias names, query injection.

In certain embodiments, the intelligent data information security server 210 may be configured to use the second machine learning model 238 to determine the structured intermediate representation 258 of the query 260. The structured intermediate representation 258 of the query 260 includes one or more data sensitive fields. For example, the one or more data sensitive fields include "finance" and "organization" for the query 260 from the user 222. In particular, the structured intermediate representation 258 of the query 260 may be a representation of grammars for code in a tree-like form, such as a concrete syntax tree (CST), to retain all the information of the text input of the query 260. In particular, the structured intermediate representation 258 of the query 260 includes one or more nodes with metadata and one or more edges with semantic meaning. The intelligent data information security server 210 may query for subtrees that match certain patterns to extract useful information associated with the one or more data sensitive fields. The second machine learning model 238 is generated using one or more LSTM networks 240 for a semantic parsing model to determine the structured intermediate representation 258 of the query 260.

In certain embodiments, the intelligent data information security server 210 may be configured to use a third machine learning model 242 and the plurality of information values 252 associated with the user 22 for the plurality of data breach fields 254 to determine a plurality of ranking value 262 of the query 260 for each of the one or more data sensitive fields. The third machine learning model 242 may be generated using a random forest algorithm 244. In particular, the intelligent data information security server 210 may apply the random forest algorithm 244 to determine a random forest model consisting of multiple decision trees. A decision tree model is a block of a random forest model and multiple decision tree models are combined to make a random forest model. For example, each individual tree in the random forest model splits out a class prediction and the class with the most selections becomes the model's winning prediction.

In certain embodiments, a decision tree model may be a tree-like model to classify one or more subjects into a map of possible outcomes of multiple related choices in which each internal node represents a test on an attribute, each branch represents an outcome of the test, and each leaf node represents a class label. A path from root to leaf is determined based on a decision tree classification rule. In particular, a decision tree typically starts with a single node, which branches into possible outcomes. Each of those outcomes leads to additional nodes, which branch off into other possible outcomes. The accuracy of a decision tree model is controlled by a depth and a node splitting function of the decision tree model at the cost of increasing computation time. A decision tree model may be evaluated using one or more metrics, such as accuracy, sensitivity, specificity, precision, miss rate, false discovery rate, and false omission rate, etc., using the measurements classified by the decision tree model. Compared to a decision tree algorithm, a random forest tree uses a large number of relatively uncorrelated decision tree models to operate as a committee to determine a winner class which usually outperforms any of individual constituent decision tree models.

In certain embodiments, the intelligent data information security server 210 may be configured to rank the one or more data sensitive fields by comparing sensitive information of the dataset associated with the plurality of systems based on the plurality of information values 252 for the plurality of data breach fields 254. For example, the intelligent data information security server 210 may determine ranking values 262 for the one or more data sensitive fields, such as a rank value of "1" for a data sensitive field of "finance" and a rank value of "2" for a data sensitive field of "organization." The rank value of "1" indicates the sensitive field of "finance" is most likely to trigger an internal data breach event. Likewise, the rank value of "2" indicates the sensitive field of "organization" is less likely to trigger an internal data breach event. The intelligent data information security server 210 may be configured to determine a data information loss value 264 using the ranking values 262 of the query 260 for the one or more data sensitive fields, such as "finance" and/or "organization". For example, the intelligent data information security server 210 may be configured to determine a respective data information loss value 264 for each of the one or more data sensitive fields. Thus, the intelligent data information security server 210 may choose the maximum data information loss value from the data information loss values for the one or more data sensitive fields. As another example, the intelligent data information security server 210 may be configured to determine an average data information loss value 264 based on a combination of the data information loss values for the one or more data sensitive fields.

In response to determining the data information loss value is smaller than a predetermined threshold, the intelligent data information security server 210 is configured to validate the query from the user to allow the user to access the dataset associated with the plurality of systems. The intelligent data information security server 210 may also update the user activity data 202 associated with the user 222 by adding the query 260 to the user activity data 202 associated with the user 222 when the data information loss value 264 of the query 260 is not significant for generation of data breach patterns. Likewise, the intelligent data information security server 210 may add the query 260 to the valid patterns 216 of the data breach criteria 214 when the data information loss value 264 of the query 260 is not significant for generation of data breach patterns.

In response to determining the data information loss value is greater than the predetermined threshold, the intelligent data information security server 210 is configured to reject the query from the user and send the query to an operator to determine information value of the query for generation of data breach patterns. Thus, the intelligent data information security server 210 may add the query 260 to the invalid patterns 218 of the data breach criteria 214 associated with the plurality of data breach fields 254 which are not accessible to the user 222 when the data information loss value 264 of the query 260 is significant for generation of data breach patterns. Likewise, the intelligent data information security server 210 may update the internal data breach events 270 based on the query 260 from the user 222.

In certain embodiments, the intelligent data information security server 210 may be configured to update the first machine learning model 232 using the updated user activity data 202 and updated data breach criteria 214 associated with the user 222. By improving data quality of user activity data 202 and data breach criteria 214, the intelligent data information security server 210 may efficiently manage internal data breach events 270 by continuously studying data exploration patterns of the user 222. The intelligent data information security server 210 may raise an alert of possible data breach to help to mitigate data breach through a preventive approach. In particular, the intelligent data information security server 210 may use the one or more machine learning model 230 to provide graphs and charts of clusters, correlations, and forecasting 266 regarding user activities and required area for the user's day to day work. In one embodiment, the intelligent data information security server 210 forwards the graphs and charts of clusters, correlations, and forecasting 266 to a user interface of the electronic device 224 that may include a dashboard, a platform, a display window, and/or the like.

Quantum Computing System

Quantum computing system 280 comprises a quantum processor 284 in signal communication with a memory 226 and network interfaces 290. Quantum processor 284 may comprise one or more quantum processors operably coupled to the memory 226. The quantum processor 284 may comprise a superconducting quantum device (with qubits implemented by states of Josephson junctions), a trapped ion device (with qubits implemented by internal states of trapped ions), a trapped neutral atom device (with qubits implemented by internal states of trapped neutral atoms), a photon-based device (with qubits implemented by modes of photons), or any other suitable device that implements qubits with states of a respective quantum system.

Memory 226 may be volatile or non-volatile and may comprise a read-only memory (ROM), random-access memory (RAM), ternary content-addressable memory (TCAM), dynamic random-access memory (DRAM), and static random-access memory (SRAM). Memory 226 may be implemented using one or more disks, tape drives, solid-state drives, and/or the like. The memory 226 is operable to store software instructions, and/or any other data and instructions. The software instructions may comprise any suitable set of software instructions, logic, rules, or code operable to be executed by the quantum processor 284 to perform one or more functions of the quantum computing system 280 described herein. In certain embodiments, the software instructions may comprise one or more quantum algorithms 282. By using the quantum processor 284 instead of the classical processor, speed of the process to manage data breach events is increased.

In certain embodiments, the quantum computing system 280 is configured to access the user activity data 202 and the data breach criteria 214 associated with the user 222 from the memory 226 and perform the one or more machine learning models 230. For example, the quantum computing system 280 may apply the first machine learning model 232 generated using the self-organizing map 234 to apply augmented analysis on the user activity data 202 associated with the user 222. In particular, the quantum computing system 280 may use the first machine learning model 232, the data breach criteria 214, and the user activity data 202 associated with the user 222 to determine a plurality of data breach fields 254 which are not intended to be accessible to the user 222. The quantum computing system 280 may use the first machine learning model 232 to determine a respective information value 252 associated with the user 222 for each of the plurality of data breach fields 254. As another example, the quantum computing system 280 may apply the second machine learning model 238 to determine the structured intermediate representation 258 of the query 260 from the user. The second machine learning model 238 may include one or more LSTM networks 240 in an encoder-decoder infrastructure. As another example, the quantum computing system 280 may use the third machine learning model 242 trained by a random forest algorithm 244 to apply generative ranking to rank the respective ranking value 262 of the query 260 for each of the one or more data sensitive fields. Thus, the quantum computing system 280 may be further configured to determine a data information loss value 264 to identify internal data breach events 270 associated with user 222 based on the respective ranking value 262 of the query 260 for each of the one or more data sensitive fields. As a result, the quantum computing system 280 may be configured to use one or more quantum computing resources to perform the first, second, and third machine learning models to evaluate data breach by studying data exploration patterns of the user 222. Likewise, the quantum computing system 280 may be configured to raise an alert of possible data breach to help to mitigate data breach through a preventive approach.

LSTM Networks

FIG. 3 illustrates machine learning model 300 configured to determine a structured intermediate representation 258 for a query 260. The intelligent data information security server 210 is configured to use the machine learning model 300, such as the second machine learning model 238 that comprises a plurality of LSTM encoders 312 and a plurality of LSTM decoders 314 in the encoder-decoder infrastructure. For example, the intelligent data information security server 210 may use the second machine learning model 238 to parse a query 260 to determine a structured intermediate representation 258 associated with the query 260. Thus, the intelligent data information security server 210 may use the structured intermediate representation 258 to interpret the user's intent associated with the query 260. For example, the intelligent data information security server 210 may use the second machine learning model 238 to determine associations between various datasets from the plurality of systems based on the query 260.

In certain embodiments, the intelligent data information security server 210 is configured to use the plurality of LSTM encoders 312 and the plurality of LSTM decoders 314 in a recurrent neural network to perform sequence to sequence prediction of the structured intermediate representation 258 for the query 260. For example, the LSTM encoders 312 include a multi-layer many-to-one structure and the LSTM decoders 314 include a multi-layer many-to-many structure with symmetrical numbers of input nodes and output nodes. The plurality of LSTM encoders 312 may use a multi-encoder architecture to map the text input of the query 260 to a corresponding semantic vector by performing two-way propagation. The semantic vector of the query 260 comprises text semantic information of the text input of the query 260. Likewise, the plurality of LSTM decoders 314 may use a multi-decoder architecture to train the plurality of LSTM decoders simultaneously using a multi-task learning mechanism to solve a function name prediction task and a code digest prediction task. The function name prediction task may improve the encoding capacity of the plurality of LSTM encoders 312 and force the plurality of LSTM encoder 312 to be more concentrated on the extraction of key information with improved quality of generated code abstract. Thus, the intelligent data information security server 210 may naturally generates a continuous-space representation of the query 260 by capturing both semantic and syntactic structures of the text input of the query 260.

Example Method for Managing Data Breach Events

FIG. 4 illustrates an example flowchart of a method 400 for managing data breach events. Modifications, additions, or omissions may be made to method 400. Method 400 may include more, fewer, or other operations. For example, steps may be performed in parallel or in any suitable order. While at times discussed as the intelligent data information security system 200, intelligent data information security server 210, processor 292, quantum computing system 280, and network interfaces 290, or components of any of thereof performing steps, any suitable system or components of the system may perform one or more steps of the method 400. For example, one or more steps of method 400 may be implemented, at least in part, in the form of software instructions, stored on non-transitory, tangible, machine-readable media (e.g., memory 226 of FIG. 2) that when run by one or more processors (e.g., processor 292 of FIG. 2) may cause the one or more processors to perform steps 405-450.

Method 400 begins at operation 405 where the intelligent data information security server 210 receives, from a plurality of systems, data breach criteria and user activity data associated with a user. The user accesses the user activity data in periodic operational work in conjunction with the plurality of systems. In particular, the plurality of systems of a large organization may comprise various components, such as finance, organization, planning, production, sales, buying, research, product development, quality assurance, HSE, etc. The user may request to access one or more databases either directly or indirectly in day to day operational support for performing various duties. The data breach criteria comprise valid patterns and invalid patterns that are used to identify normal data fields and internal data breach events. For example, the valid patterns comprise a plurality of normal data fields which are accessible to the user. As another example, the invalid patterns comprises a plurality of data breach fields which are not intended to be accessible to the user.

At operation 410, the intelligent data information security server 210 uses a first machine learning model, the data breach criteria, and the user activity data associated with the user to determine a plurality of data breach fields which are not intended to be accessible to the user. The first machine learning model may be generated using a self-organizing map (SOM) algorithm to apply augmented analysis on the user activity data associated with the user.

At operation 415, the intelligent data information security server 210 uses the first machine learning model to determine a respective information value associated with the user for each of the plurality of data breach fields. In particular, the intelligent data information security server 210 may determine a plurality of likelihood values for a plurality of natural clusters associated with the user activity data associated with the user based on the plurality of data breach fields. As a result, the intelligent data information security server 210 may determine an information value associated with the user for a respective data breach field using the plurality of likelihood values for the plurality of natural clusters for the respective data breach field.

At operation 420, the intelligent data information security server 210 receives a query from the user to request access a dataset associated with the plurality of systems. The query comprises a text input based on a plurality of SQL fields, such as sequence order, alias names, query injection, etc.

At operation 425, the intelligent data information security server 210 uses a second machine learning model to determine a structured intermediate representation of the query. The structured intermediate representation of the query comprises one or more data sensitive fields. In particular, the second machine learning model is generated using one or more LSTM networks in an encoder-decoder architecture to parse the text input of the query from the user. As a result, the intelligent data information security server 210 may use semantic parsing to determine the structured intermediate representation of the query in logical form by converting a natural language word to logical form to help machine understandable representation.

At operation 430, the intelligent data information security server 210 uses a third machine learning model and the respective information value associated with the user for each of the plurality of data breach fields to determine a respective ranking value of the query for each of the one or more data sensitive fields. In particular, the third machine learning model is generated using a random forest algorithm and uses generative ranking to rank the respective ranking value of the query for each of the one or more data sensitive fields.

At operation 435, the intelligent data information security server 210 determines a data information loss value using the respective ranking value of the query for each of the one or more data sensitive fields. The data information loss value may be used to identify a threat of an internal data breach event based on a predetermined threshold.

At operation 440, the intelligent data information security server 210 determines whether the data information loss value is below the predetermined threshold.

At operation 445, the intelligent data information security server 210 validates the query from the user to allow the user to access the dataset associated with the plurality of systems when the data information loss value is below the predetermined threshold.

At operation 450, the intelligent data information security server 210 rejects the query from the user and sends the query to an operator to determine information value of the query for generation of data breach patterns when the data information loss value is above the predetermined threshold.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated with another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

To aid the Patent Office, and any readers of any patent issued on this application in interpreting the claims appended hereto, applicants note that they do not intend any of the appended claims to invoke 35 U.S.C. § 112(f) as it exists on the date of filing hereof unless the words "means for" or "stepfor" are explicitly used in the particular claim.

The invention claimed is:

1. A system comprising: one or more computing devices comprising at least one processor and a memory configured to store a first machine learning model, a second machine learning model, and a third machine learning model, the processor configured to: receive, from a plurality of systems, data breach criteria and user activity data associated with a user, wherein the user accesses the user activity data in periodic operational work in conjunction with the plurality of systems; determine, using a first machine learning model, the data breach criteria, and the user activity data associated with the user, a plurality of data breach fields which are not intended to be accessible to the user; determine, using the first machine learning model, a respective information value associated with the user for each of the plurality of data breach fields; receive a query from the user to request access to a dataset associated with the plurality of systems; determine, using a second machine learning model, a structured intermediate representation of the query, wherein the structured intermediate representation of the query includes one or more data sensitive fields; determine, using a third machine learning model and the respective information value associated with the user for each of the plurality of data breach fields, a respective ranking value of the query for each of the one or more data sensitive fields; determine a data information loss value using the respective ranking value of the query for each of the one or more data sensitive fields; validate the query from the user to allow the user to access the dataset associated with the plurality of systems; and use one or more quantum computing resources to perform the first, second, and third machine learning models to evaluate data breach by studying data exploration patterns of the user, raise an alert of possible data breach to help to mitigate data breach through a preventive approach.

2. The system of claim 1, wherein the processor is configured to: in response to determining the data information loss value is greater than the predetermined threshold, reject the query from the user and send the query to an operator to determine information value of the query for generation of data breach patterns.

3. The system of claim 2, wherein the processor is further configured to: in response to determining the data information loss value of the query is significant for generation of data breach patterns, add the query to the data breach criteria associated with the plurality of data breach fields which are not accessible to the user.

4. The system of claim 2, wherein the processor is further configured to: in response to determining the data information loss value of the query is not significant for generation of data breach patterns, update the user activity data associated with the user by adding the query to the user activity data associated with the user.

5. The system of claim 4, wherein the processor is further configured to: in response to determining the information value of the query is not significant for generation of data breach patterns, update the first machine learning model using the updated user activity data associated with the user.

6. The system of claim 1, wherein the query from the user includes a text input based on a plurality of structured query language (SQL) fields, the plurality of SQL fields include sequence order, alias names, query injection.

7. The system of claim 1, wherein the first machine learning model is generated using a self-organizing map (SOM) algorithm to apply augmented analysis on the user activity data associated with the user.

8. The system of claim 1, wherein the second machine learning model is generated using one or more Long Short-Term Memory (LSTM) algorithms and uses semantic parsing to determine the structured intermediate representation of the query in logical form by converting a natural language word to logical form to help machine understandable representation.

9. The system of claim 1, wherein the third machine learning model is generated using a random forest algorithm and uses generative ranking to rank the respective ranking value of the query for each of the one or more data sensitive fields.

10. A method comprising: receiving, from a plurality of systems, data breach criteria and user activity data associated with a user, wherein the user accesses the user activity data in periodic operational work in conjunction with the plurality of systems; determining, using a first machine learning model, the data breach criteria, and the user activity data associated with the user, a plurality of data breach fields which are not intended to be accessible to the user; determining, using the first machine learning model, a respective information value associated with the user for each of the plurality of data breach fields; receiving a query from the user to request access to a dataset associated with the plurality of systems; determining, using a second machine learning model, a structured intermediate representation of the query, wherein the structured intermediate representation of the query includes one or more data sensitive fields; determining, using a third machine learning model and the respective information value associated with the user for each of the plurality of data breach fields, a respective ranking value of the query for each of the one or more data sensitive fields; determining a data information loss value using the respective ranking value of the query for each of the one or more data sensitive fields; validating the query from the user to allow the user to access the dataset associated with the plurality of systems; and using one or more quantum computing resources to perform the first, second, and third machine learning models to evaluate data breach by studying data exploration patterns of the user, raise an alert of possible data breach to help to mitigate data breach through a preventive approach.

11. The method of claim 10, further comprising: in response to determining the data information loss value is greater than the predetermined threshold, rejecting the query from the user and send the query to an operator to determine information value of the query for generation of data breach patterns.

12. The method of claim 11, further comprising: in response to determining the data information loss value of the query is significant for generation of data breach patterns, adding the query to the data breach criteria associated with the plurality of data breach fields which are not accessible to the user.

13. The method of claim 11, further comprising: in response to determining the data information loss value of the query is not significant for generation of data breach patterns, updating the user activity data associated with the user by adding the query to the user activity data associated with the user.

14. The method of claim 13, further comprising: in response to determining the information value of the query is not significant for generation of data breach patterns, updating the first machine learning model using the updated user activity data associated with the user.

15. The method of claim 10, wherein the query from the user includes a text input based on a plurality of structured query language (SQL) fields, the plurality of SQL fields include sequence order, alias names, query injection.

16. The method of claim 10, wherein the first machine learning model is generated using a self-organizing map (SOM) algorithm to apply augmented analysis on the user activity data associated with the user.

17. The method of claim 10, wherein: the second machine learning model is generated using one or more Long Short-Term Memory (LSTM) algorithms and uses semantic parsing to determine the structured intermediate representation of the query in logical form by converting a natural language word to logical form to help machine understandable representation, and the third machine learning model is generated using a random forest algorithm and uses generative ranking to rank the respective ranking value of the query for each of the one or more data sensitive fields.

18. A non-transitory computer-readable medium storing instructions that when executed by a processor cause the processor to: receive, from a plurality of systems, data breach criteria and user activity data associated with a user, wherein the user accesses the user activity data in periodic operational work in conjunction with the plurality of systems; determine, using a first machine learning model, the data breach criteria, and the user activity data associated with the user, a plurality of data breach fields which are not intended to be accessible to the user; determine, using the first machine learning model, a respective information value associated with the user for each of the plurality of data breach fields; receive a query from the user to request access to a dataset associated with the plurality of systems; determine, using a second machine learning model, a structured intermediate representation of the query, wherein the structured intermediate representation of the query includes one or more data sensitive fields; determine, using a third machine learning model and the respective information value associated with the user for each of the plurality of data breach fields, a respective ranking value of the query for each of the one or more data sensitive fields; determine a data information loss value using the respective ranking value of the query for each of the one or more data sensitive fields; validate the query from the user to allow the user to access the dataset associated with the plurality of systems; and using one or more quantum computing resources to perform the first, second, and third machine learning models to evaluate data breach by studying data exploration patterns of the user, raise an alert of possible data breach to help to mitigate data breach through a preventive approach.

* * * * *